Nov. 18, 1969  W. P. WEGLARZ  3,478,553
METHOD OF FORMING SANDWICH PANELS
Filed Feb. 14, 1962

INVENTOR.
Walter P. Weglarz.
BY John B. Sowell
ATTORNEY

United States Patent Office 3,478,553
Patented Nov. 18, 1969

3,478,553
METHOD OF FORMING SANDWICH PANELS
Walter P. Weglarz, Lafayette Hill, Pa., assignor to The Budd Company, Philadelphia, Pa., a corporation of Pennsylvania
Filed Feb. 14, 1962, Ser. No. 173,172
Int. Cl. B21d *11/04*
U.S. Cl. 72—46    8 Claims This invention relates generally to a method of forming flat sandwich panels into compound curved shapes and more particularly to a method of economically forming resistance welded rocket motor casing from sandwich panels.

Heretofore rocket motor casings were fabricated by brazing or attaching a plurality of individual radial segments together to form a substantially annular compound curved chamber. Tube bundles, formed channel shapes, and drilled rods have been employed with success to make the hollow walled structure required of rocket motor casings. The cost of such segmented structure is astronomical and the product produced must be over designed because of non-uniform structural limitation imposed by the method of fabrication.

Theoretically sandwich structures can be designed that will overcome the design limitation imposed upon individual radial segments, but sandwich panels have not been employed as rocket motor casings because they too present fabrication problems. The usual method of making compound curvature sandwich panel shapes is to form the core and skin sheets separately and then attach the formed skin sheets to the formed core. This method is generally limited to connection by adhesives or brazing; and the extreme precision required of fitting the parts makes the cost prohibitive and the results unpredictable. There is no present practical method for welding such complex shapes together after the core and kin sheet have been formed.

Attempts to form flat welded sandwich panels into single curvature shapes have been performed by known methods, but these methods are not applicable to forming compound shapes especially when the panel to be formed is not of uniform thickness and the shape is complex.

It is therefore a principal object of the present invention to provide an improved method of forming sandwich panels into complex shapes.

It is a further object of the present invention to provide a method of forming sandwich panels with a single male die or punch.

It is a further object of the present invention to provide a method of forming sandwich panels which does not elongate or shrink the inner skin sheet of the panel.

It is still another object of the present invention to provide a more economical method of forming sandwich panels.

Other features and objects of the invention will be found throughout the more detailed description of the invention which follows. Those novel features believed to be descriptive of the nature of the invention are described with particularity in the appended claims. To more clearly portray the invention and its manner of operation the description is supplemented with the accompanying drawings:

Referring now in more detail to the several figures of the drawings: The sandwich panel 10 comprises an upper skin sheet 12, a lower skin sheet 14 and a plurality of vertical sections of webs 16. The distance between the webs 16 may be uniform or varied, causing the width of the panel 10 to vary, and the depth of the webs 16 may vary causing the thickness of the panel to vary. The configuration of sandwich panel 10 is representative of an optimum structure employed in rocket nozzles and varies in width and depth.

Figure 3:
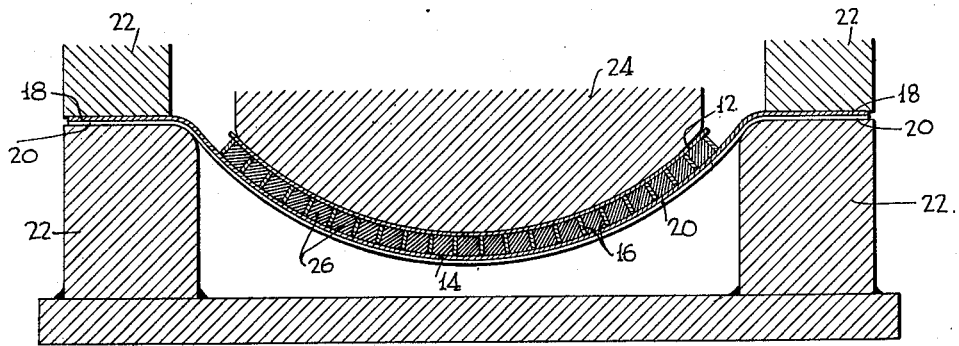
FIG. 3 is a sectional elevation of the sandwich panel at maximum depth of draw of FIGS. 1 and 2 after being formed by a male die.

Lower skin sheet 14 is provided with lateral extensions 18 along the length of the panel 10. A tension plate 20 is mounted flat against the lower skin sheet 14, 18 and then clamped into the clamping member 22. Plate 20 and lower skin sheet 14, 18 may be welded together at their edges and/or both welded to a single clamp 22 to avoid slippage of the lower skin sheet 14, 18 and plate 20. Clamping member 22 may be the retaining ring or draw ring of a brake press or may be a simple rigid support as shown in FIG. 3. Lower clamping member 22 is preferably rounded at the edge to avoid setting up stress concentrations in skin sheet 14, 18 or plate 20. Any type clamp may be provided that will hold the tension plate sufficiently tight to allow the die 24 to overcome its yield strength.

The sandwich panel illustrated is filled with an inelastic material 26 which may be added after panel 10 is formed. If the panel is constructed with forged and fused resistance welds the inelastic material 26 is attached to the vertical webs prior to the attachment of the skin sheets. An inelastic material 26 such as tin, lead, zinc or copper completely fills the voids between webs and skin sheets and only acts to transmit forces in compression thus preventing the skin sheets and webs from buckling into the space occupied by the inelastic material 26.

After the tension plate 20 is mounted with panel 10 on top of it and the assembly is clamped into member 22, die 24 is then forced against the upper skin sheet 12 until the skin sheet 12 completely contacts the forming die 24 over its entire compound shape. Either the stroke of the die 24 or the placement of the panel may be varied to completely form the upper skin sheet and the panel.

Ordinarily any attempt to bend a hollow rigid sandwich panel will cause failure of the core or webs before the panel is bent. Ordinarily any attempt to bend a filled sandwich panel will cause failure in one of the skin sheets before the panel will take a permanent set. An exact explanation for the novel result does not follow standard theory of beams and columns.

A first explanation presumes that the selected tension strap 20 has a higher yield strength than the outer skin 14. When the die 24 begins to elongate the outer skin 14, the tension strap still has sufficient strength to oppose the die 24 causing compressive forces on the skin sheets which tend to squeeze the core and flow matrix material 26 to the new radial shape. Since the compressive forces in the inner skin sheet 12 are insufficient to buckle the sheet between webs or crush the webs there is no change in area of the matrix material, but it flows to an optimum shape leaving the inner skin sheet the same length as it was before it was formed. This theory is substantially supported because the inner skin sheet 12 is formed as a complex shape without any apparent change in surface area.

A second explanation presumes that both the tension strap 20 and the outer skin sheet 14 are simultaneously displaced at their independent yield points; strap 20 and skin sheet 14 have sufficient bonding adhesion between them to act as a single composite plate being stretch drawn. Compressive forces due to the die acting against the composite plate prevents the matrix filled core and inner skin sheet 12 from buckling. The action is similar to stretch bending of the composite plate, with the core and inner skin sheet 12 formed essentially by the composite plate.

Probably both conditions exist to some extent for both bending and forming is performed on the inner skin sheet 12 while drawing and forming is accomplished in the outer skin sheet 14. The core comprising the webs 16 and matrix material 26 is formed, bent and drawn to conform between the two skin sheets.

By selecting a tension strap of such a strength that the upper skin sheet is neither in compression or tension, the upper skin sheet will form around the male die without a change in surface area. If the tension strap is too weak or not employed, all the stretch in the lower skin sheet will take place outside the ends of the panel 10. This condition causes the vertical webs to remain vertical and induces compression and buckling failures in the upper skin sheet, but usually the lower skin sheet will rupture or crack at the edges before the panel is completely formed.

By selecting a tension strap of excessive strength, buckling will occur in the upper skin sheet and vertical webs.

In a preferred embodiment shown, the height of the flat panel varied from 0.2 inch to 0.4 inch in a double taper along the long axis. The sandwich panel skin sheets and webs were constructed from .030 inch stainless steel and the tension plate was constructed of .075 inch cold rolled low carbon steel having a tension strength about 30 percent higher than the stainless steel. The matrix material employed was pure tin.

If a stronger matrix material such as copper is used a stronger tension strap is usually required. A more rigid sandwich panel or a deeper draw usually requires a stronger tension strap and in extreme cases of deep draw, may require that the tension plate and lower skin sheet be bonded together by strong adhesives.

Figure 1:
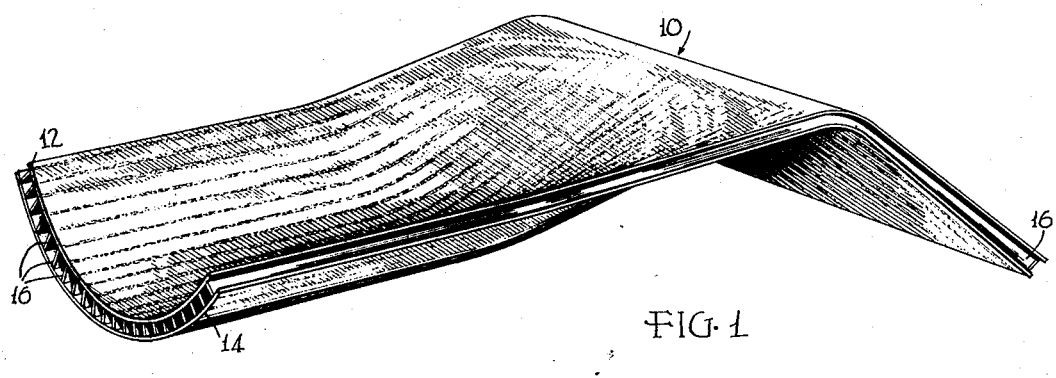
FIG. 1 is a perspective view of a sandwich panel which has been formed into a complex curvature panel of a rocket casing.
Figure 2:
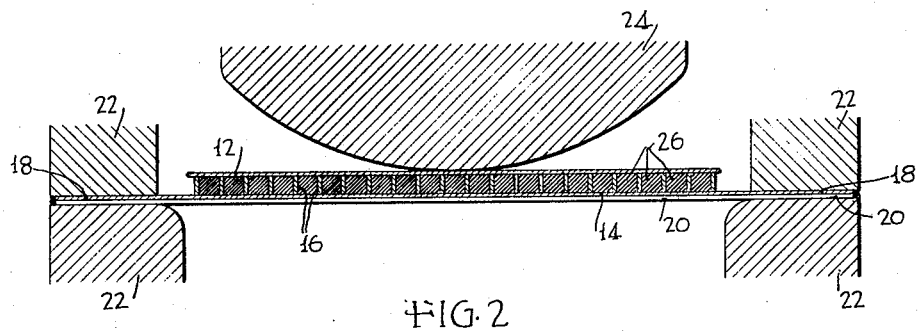
FIG. 2 is a sectional elevation of the sandwich panel of FIG. 1 prior to being formed by a male die.

The male die 24 was made of molded Kirksite, formed to the exact dimensions of the inner contour of a section of a rocket nozzle. Panel 10 shown in FIG. 1 is the finished panel produced by removing the tension plate and melting the tin 26 from the core.

This method is not limited to rocket nozzles or to sandwich panels having vertical shapes for it is apparent it may be applied to other sandwich panel structures where it is desired to control the critical inner dimension of the inner skin sheet and perform bending and drawing of complex shapes having uniform or non-uniform thickness. The invention should be construed liberally and various changes and modifications may be made without departing from the spirit and scope of the invention.

What is claimed is:

1. The method of forming flat sandwich panels into curved rocket casing elements comprising, providing a flat sandwich panel having an upper skin sheet, a lower skin sheet and a core filled with a low melting temperature metal, providing lateral extension of said lower skin sheet beyond said core and said upper skin sheet, attaching a tension plate adjacent to said lower skin sheet, clamping said lower skin sheet and said tension plate of said sandwich panel into a fixed clamping member, providing a male punch inside said fixed clamping member, simultaneously forming said upper skin sheet of said sandwich panel with said male punch and tension forming said lower skin sheet between said core and said tension plate while said tension plate holds said panel in compression, removing said low melting temperature metal in said core, and removing said tension plate from said formed sandwich panel.

2. The method of forming a vertical web sandwich panel into a compound curved panel having radially displaced webs comprising; providing a flat sandwich panel having an upper skin sheet, a lower skin sheet and vertical webs connecting said skin sheets; placing a flat tension plate on the lower skin sheet of said panel to form a composite layer adjacent with said skin sheet, attaching said flat tension plate and said lower skin sheet to a restraining clamping member leaving said vertical webs and said upper skin sheet unrestrained, forcing a male die against said upper skin sheet to form said panel and said tension plate over said die, said upper skin sheet of said panel being formed without lateral strain and said lower skin sheet being tension formed over said vertical webs, and removing said tension plate.

3. The method of forming a filled flat sandwich panel comprising, mounting a sandwich panel on a tension plate with the lower skin sheet of the panel in surface contact with the tension plate, attaching said tension plate and said lower skin sheet to a fixed restraining clamp to prevent lateral movement of said plate and said sheet so clamped, forcing a male die against the upper skin sheet of said sandwich panel to wrap said upper skin sheet of said panel around said male die thereby simultaneously stretch drawing said tension plate and said lower skin sheet, and removing said tension plate from said sandwich panel.

4. The method of tension forming the lower skin sheet of a sandwich panel without tension forming the upper skin sheet of said panel comprising, providing a sandwich panel with a lower skin sheet larger than the panel, attaching a tension plate to the lower skin sheet, clamping the tension plate and lower skin sheet in a fixed rigid clamp, and forming said panel and said tension plate by die forming said upper skin sheet with a male die.

5. The method of forming complex shapes from flat sandwich panels comprising: providing a substantially flat sandwich panel comprising a filled core, an upper and a lower skin sheet; placing a substantially flat tension plate adjacent said lower skin sheet, said tension plate having a higher yield strength than said lower skin sheet; clamping the edges of said lower skin sheet and said tension plate to a clamping member; and tension forming said lower skin sheet and said tension plate by forcing a male die against said upper skin sheet to wrap said sandwich panel and said upper skin sheet around said die.

6. The method according to claim 5 wherein said tension plate is bonded to said lower skin sheet by a strong adhesive.

7. The method of making rocket plug nozzles from flat plane sandwich panels having upper and lower skin sheets interconnected by vertical ribs comprising;

attaching to the lower skin sheet of said panel a tension plate, said tension plate extending laterally beyond said panel, attaching the lateral extension of said tension plate to laterally fixed restraining clamps so that tension is placed in the tension plate and in the lower skin sheet when the panel is bent out of its normally flat plane, leaving unrestrained the upper skin sheet so that said upper skin sheet is unaffected by tension forces exerted on said tension plate and said lower skin sheet, moving a male punch into engagement with said upper skin sheet by relative movement of the male punch normal to the flat plane sandwich panel, and simultaneously forming said upper skin sheet without lateral dimensional change while forming and laterally elongating said lower skin sheet while said tension strap holds said panel in compression against said male punch to prevent buckling.

8. The method of die-forming sandwich panels having two outer skin sheets connected to an inner core section comprising, providing a sandwich panel having one of said outer skin sheets which extends laterally beyond said inner core section, attaching a tension plate to said outer skin sheet which extends beyond said inner core section, clamping said tension plate in a clamping fixture to hold said panel against axial movement and to hold the edges of the tension plate against inward movement toward said panel, bending the other of said outer skin sheets by axial movement of a male punch against said other sheet on the side of the panel opposite said attached tension plate, stretching said tension plate in uniform tension by axial movement of said male punch against said panel to bend said panel out of its horizontal plane, stretching said outer skin sheet in uniform tension by axial movement of said male punch against said panel to bend said panel out of its horizontal plane, die-forming said panel with said male punch engaging said other of said skin sheets, said panel being held against said male punch by compressive forces exerted on said panel by said tension strap, and removing said tension strap from said panel leaving a die-formed sandwich panel whose skin sheet which was adjacent said male punch is wrapped formed without stretching or buckling said sheet.

References Cited
UNITED STATES PATENTS

| | | | |
|---|---|---|---|
| 2,742,387 | 4/1956 | Guiliani | 154—45.9 |
| 2,988,809 | 6/1961 | Hall | 29—455 |
| 3,060,561 | 10/1962 | Watter | 29—455 |

LELAND A. SEBASTIAN, Primary Examiner

U.S. Cl. X.R.

72—296, 305, 465; 156—221